United States Patent

Berman et al.

[11] 3,752,985
[45] Aug. 14, 1973

[54] PORTABLE DETECTOR FOR DOSIMETRY OF X AND GAMMA RADIATION

[75] Inventors: Francis Berman, Le Raincy; Paul Courtaud, Massy; Claude Dioux, Monthlery; André Manifacier, Fontenay-aux-Roses; André Raboeuf, Morangis; Pierre Ruffet, Marolles en Hurepoix, all of France

[73] Assignee: Commissariat AL Energie Atomique, Paris, France

[22] Filed: Feb. 9, 1970

[21] Appl. No.: 9,726

[52] U.S. Cl. ............................................. 250/472
[51] Int. Cl. ................................................ G01t 1/14
[58] Field of Search .............................. 250/83.3 PD

[56] References Cited
UNITED STATES PATENTS

| | | | |
|---|---|---|---|
| 2,613,327 | 10/1952 | Beckman et al. | 250/83.3 PD X |
| 2,875,343 | 2/1959 | Birkhoff | 250/83.3 PD |
| 3,067,331 | 12/1962 | Hess et al. | 250/83.3 PD |
| 2,683,234 | 7/1954 | Lynch | 250/108 R X |
| 2,950,393 | 8/1960 | Southward | 250/108 R X |

FOREIGN PATENTS OR APPLICATIONS 690,409  4/1953  Great Britain............... 250/83.3 PD Primary Examiner—James W. Lawrence
Assistant Examiner—Davis L. Willis
Attorney—Cameron, Kerkam & Sutton

[57] ABSTRACT

In a dosimeter comprising a microscope and a fiber electrometer contained in a thin-walled cylindrical ionization chamber, at least one sleeve can be caused to slide over the exterior of the chamber so as to cover or uncover its thin wall, thereby endowing the dosimeter with a selectable response equivalent to radiation doses absorbed under a protection of different thicknesses of human body tissue, instant measurements being taken as a function of the skin dose by means of a double-scale reticule.

9 Claims, 3 Drawing Figures

PATENTED AUG 14 1973 3,752,985

PORTABLE DETECTOR FOR DOSIMETRY OF X AND GAMMA RADIATION

This invention relates to portable detectors for measuring ionizing radiations and in particular X- and gamma-radiations. A detector of this type, usually referred-to as a pen dosimeter or pocket fiber electrometer, comprises a miniature ionization chamber associated with an electroscope which permits immediate reading of radiation doses received by the detector.

In many types of pocket fiber electrometers at present in use, an outer container is designed to accommodate an electroscope, the moving element of which usually consists of a metallized quartz fiber placed within an ionization chamber. A microscope for viewing the quartz fiber is mounted at one end of this latter and an end cap for charging the electrometer from an external direct-current voltage source is placed at the other end. In pocket or pen meters which are designed for the measurement of high doses, provision is also made for a capacitor which is connected in parallel with the electroscope. The outer container performs a number of different functions: on the one hand, its rigidity prevents any relative displacement of the electroscope and the viewing microscope; on the other hand, the container wall absorbs a fraction of the radiations to which the detector is subjected and modifies the response of the ionization chamber to radiations. This last-mentioned property is turned to useful account in the latest designs of pocket fiber electrometers such as the pen dosimeter which is produced by the company known as Societe Physiotechine and designated by reference SEQ 5. In this design, the container is fabricated from light alloy and has a thickness such that its absorption corresponds to that of the soft tissues which protect the most sensitive organ of the human body, namely the crystalline lens of the eye (the thickness corresponds to 300 mg/cm$^2$ of soft tissues). This pen meter thus provides effective indications in respect of $\gamma$ and X radiations entering the eye having energies between 50 KeV and 5 MeV.

In order to prevent errors in measurement, the microscope and the electrometer must be maintained strictly in fixed relation to each other. In pen dosimeters which have been produced up to the present time, the condition just mentioned is satisfied by virtue of the rigidity of the outer container. The container must therefore have a substantial wall thickness, with the result that it proves impossible to endow said container with properties such that it permits measurement of the "skin" dose, that is to say the dose absorbed by tissues which are protected only by a thickness of 7 mg/cm$^2$ of soft tissues. However, an absorbed dose to a depth of 7 mg/cm$^2$ is applied as a particular criterion in regulations used in France and in most countries of the Western world which governs the protection of radiation workers.

There has also been developed a class of detector which is commonly referred-to as a capacitor-type pocket meter and in which provision is not made for an electrometer, readings being taken by measuring the residual charge of a capacitor. Pocket meters of this type can have a thin-walled outer casing or container which is adapted to the measurement of absorbed radiations under a protection corresponding to 7 mg/cm$^2$ of tissues. However, these detectors are attended by major disadvantages in that immediate and direct measurements cannot be taken by the wearer and that the measurement destroys the information.

The main object of the invention is to provide a pen dosimeter which meets practical requirements more effectively than those which have been proposed up to the present time, particularly insofar as it provides the wearer with a free choice in the measurement of absorbed doses under one of a number of protection thicknesses (usually two) without thereby entailing any disadvantage in regard to relative immobilization of the electrometer and the viewing microscope.

To this end, the invention proposes a detector which serves to measure ionizing radiations, in particular X and $\gamma$ radiations, and which comprises a microscope having an eyepiece and an objective, an electroscope and an end cap for charging the electroscope which are disposed in end-to-end relation in that order within a container, wherein the electroscope is mounted on the nosepiece of the microscope and placed within an ionization chamber which is limited by a thin leak-tight wall.

In a preferred although non-limitative embodiment, the detector comprises a sleeve having a calibrated thickness and displaceable on the container so that said sleeve may be moved to a position in which it covers the thin wall and withdrawn from said position and the microscope comprises at least two measurement scales such that one scale corresponds to the response of the detector when the sleeve covers the thin wall whilst the other scale serves to interpret said response when the sleeve is separated from the thin wall as a function of surface irradiation standards.

By virtue of the fact that the electroscope is mounted directly on the nosepiece of the microscope, it is possible to adopt a thin-walled container which is limited to junction arms at the level of the ionization chamber inasmuch as possible deformations of said container cannot result in relative displacement of the moving element with respect to the microscope but only in unobjectionable modification of the relative position of the microscope casing and the charging end cap. The thin wall which defines the chamber and surrounds the electroscope can therefore be given a thickness and a construction such as to be equivalent to a tissue layer of 7 mg/cm$^2$. After it has been placed in position, the sleeve is accordingly designed to make the detector equivalent from the biological point of view to doses received at a depth protected by 300 mg/cm$^2$ of tissues or any other thickness which may be chosen.

The pen dosimeter can be provided for checking purposes with a removable ring which contains thermoluminescent material and is carried by the microscope casing A clearer understanding of the invention will be obtained from the following description of one form of construction which is given by way of example but without any implied limitation, reference being made to the accompanying drawings, in which.

Figure 1:
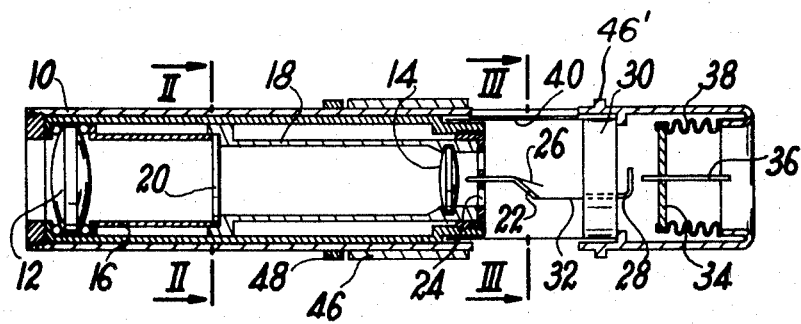
FIG. 1 is a very diagrammatic central sectional view of a pen dosimeter according to the invention.
Figure 2:
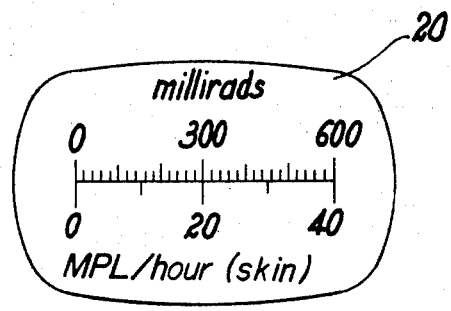
FIG. 2 shows the double measurement scale of the microscope in the plane II—II of FIG. 1.

The pen dosimeter which is illustrated in FIG. 1 comprises a cylindrical casing or container 10, the ends of which can be closed by means of caps which are not shown in the figure. One of the terminal portions of said container (namely the left-hand portion shown in FIG. 1) contains a microscope for reading the residual charge of the electroscope. Said microscope is made up of an eyepiece 12 and an objective 14 which are positionally maintained with respect to each other by means of a mechanical structure. This structure serves to fix a reticule 20 in the image plane which is conjugate with respect to the objective of the area of displacement of the moving fiber of the electroscope. Said reticule is provided with two measurement scales (as shown in FIG. 2) which will be described hereinafter.

Figure 3:
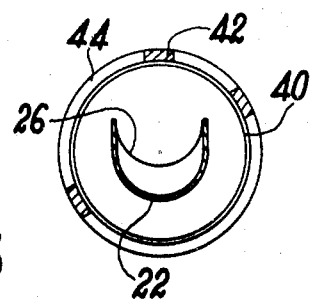
FIG. 3 is a sectional view along line III—III of FIG. 1.

An intermediate portion of the casing 10 contains the electroscope and the ionization chamber which is associated therewith. Whereas the electroscope was carried by the casing or outer container in pocket fiber electrometers of the prior art, said electroscope is mounted in this case on the terminal portion of the spacer tube 18 which forms a nosepiece of the microscope. Said electroscope is constituted by a stationary element consisting, for example, of a bow of copper wire 22 which is joined to the terminal portion of the tube 18 by means of radial arms 24, and by a movable element 26 consisting, for example, of a bow of metallized quartz fiber having a few microns in diameter which is bonded to the stationary element (as shown in FIG. 3). The stationary element is joined by means of a conductor wire 32 which is parallel to the axis of the container 10 to a contact strip 28 which is attached to said container by means of an insulating support 30. It is apparent that, in the event of deformation of the container 10 which may cause relative movements between the contact strip 28 and the microscope, said conductor 32 must be so arranged that it does not displace the elements 22 and 26 of the electroscope with respect to the microscope.

The terminal portion of the container 10 which is remote from the microscope constitutes a charging end cap. Said end cap is fitted with an insulating plate 34 which is preferably formed of transparent material and adapted to carry a movable contact rod 36 which is coaxial with the container. The plate is joined to the extremity of the container by means of a flexible bellows 38 which serves to maintain the tip of the contact rod 36 in spaced relation with the contact strip 28 when no external force is applied, thereby isolating said strip and the elements 22 and 26 of the electroscope. On the contrary, when the container is mounted on a conventional charging device, the inward displacement of the rod re-establishes a contact and serves to establish the requisite potential difference between the elements and the container.

The elements 22 and 26 of the electroscope and the conductor wire 32 can be considered as the central electrode of a miniature ionization chamber whose lateral cylindrical wall is constituted by a thin cylindrical leak-proof liner tube 40 which is located within the container 10. Opposite to the ionization chamber, said container is limited to three arms 42 having a small angular development and defining windows 44 of substantial width. Thus, the absorption due to the container has practically no effect on the response of the ionization chamber. This construction of the container 10 evidently results in substantial impairment of rigidity but this does not entail any disadvantage by reason of the fact that the electroscope is mounted directly on the microscope.

A sleeve 46 of calibrated thickness is adapted to slide over the container 10 and can thus be moved either to the withdrawn position in which it is shown in FIG. 1 or to a position opposite to the windows 44 where it engages abutment or stop 46'. In the first case, only the liner tube 40 is interposed on the path of radiations which produce action on the ionization chamber and the electroscope. In the second case, the action of the wall of the sleeve 46 is added to the action of the liner tube 40.

In a preferred embodiment of the invention, the liner tube 40 is formed of a meterial which is equivalent to human tissues and which has a thickness such as to correspond to an absorption by 7 mg/cm$^2$ of tissues. Examples of wall compositions having a response which is similar to that of human tissues can be found in numerous documents. The measurement scale which corresponds to the withdrawn position of the sleeve 46 (namely the top scale shown in FIG. 2) is advantageously intended for a dose of 0 to 600 millirads which, in the withdrawn position of the sleeve 46, corresponds to the maximum permissible weekly "skin dose" received by radiation workers. The additional scale (namely the bottom scale in FIG. 2) can be graduated, not in millirads, but in 40 indices over the full scale deflection corresponding to the total value of the maximum permissible weekly dose, that is to say in MPL/hr (wherein the abbreviation MPL designates the maximum permissible limit for the dose received in 1 week at least if there are 40 work hours per week). The thickness of the sleeve 46 which is also made of tissue-equivalent material is advantageously selected so that the response of the ionization chamber should be the same as that of tissues protected by a layer of 300 mg/cm$^2$ when said sleeve is in position. The pocket fiber electrometer which is illustrated in FIG. 1 is completed by a removable ring 48 containing thermoluminescent substances which are calibrated so as to permit checking of doses received under a protection of 7 mg/cm$^2$ of tissues, even when the sleeve 46 is placed above the ionization chamber.

It is clearly apparent that the detector could be fitted with two sleeves instead of one and that either of said sleeves as selected by the wearer could be brought opposite to the wall of the ionization chamber, the number of measurement scales on the reticule 20 being in that case greater than two.

The invention thus makes it possible to provide a pocket fiber electrometer which meets essential requirements of dosimetry without any substantial increase either in weight or overall size. In particular, an instrument of this type which has actually been constructed and has a weight of 50 g makes it possible to measure absorbed doses under a protection either of 7 mg/cm$^2$ or 300 mg/cm$^2$ of tussues.

We claim:

1. A detector for measuring ionizing radiations and in particular X and $\gamma$ radiations, comprising a microscope having an eyepiece, an objective and a nosepiece, an electroscope and an end cap for charging the electroscope disposed in end-to-end relation in that order within a container, an ionization chamber surrounding said electroscope, a thin leak-proof wall defining said chamber and a sleeve having a calibrated thickness displaceably mounted on said container between a position in which it covers said thin wall and a position in which it is withdrawn from said thin wall, said container being joined to said charging end cap by a plurality of narrow arms around said thin leak-proof wall.

2. A radiation dosimeter comprising: an elongated container housing, including a first end portion and a second end portion connected by a plurality of longitudinal arms of small peripheral width;
- a microscope having an eyepiece, a reticle and a nosepiece carrying an objective lens in one of said end portions;
- a leak-proof tubular wall thinner than said end portions, located inside said arms and defining a substantially leak-proof electroscope chamber;
- electroscope electrodes carried by said nosepiece and projecting into said electroscope chamber;
- and electric charge transfer means located in said second end portion, comprising electrically insulating flexible wall means defining said electroscope chamber and central contact means sealed in and projecting through said wall providing an electrical communication between said electrode means and outside charge means.

3. A radiation dosimeter according to claim 2, wherein said tubular wall is of material which is tissues equivalent for X and gamma rays.

4. A radiation dosimeter according to claim 3, wherein said tubular wall is of such thickness that the electrometer response is equivalent to that of tissues protected by a layer of 7 mg/cm$^2$.

5. A radiation dosimeter according to claim 2, comprising three arms of small circumferential width which leave a half cylinder portion of the wall substantially free of said arms.

6. A radiation dosimeter according to claim 2, including a sleeve of material which is substantially tissues equivalent for X and gamma rays slidably mounted on said container for movement between a first position where said sleeve is entirely withdrawn from said thin wall of said electroscope chamber and a second position where said sleeve entirely covers said thin wall.

7. An ionizing radiation detector in accordance with claim 6, said microscope including at least two measurement scales, one of said scales corresponding to the response of the detector whether said sleeve covers said thin wall said other of said scales reading said response as a function of the standards when said sleeve is withdrawn from said thin wall.

8. A detector in accordance with claim 6 the material of said sleeve and the thickness providing the detector with a response corresponding to an absorption by 300 mg/cm$^2$ of human tissues when said sleeve covers said thin wall.

9. A radiation dosimeter according to claim 6, having abutment means provided on said second end portion limiting the extent of movement of said sleeve toward its second position.

* * * * *